US007787490B2

(12) United States Patent
Azevedo et al.

(10) Patent No.: US 7,787,490 B2
(45) Date of Patent: *Aug. 31, 2010

(54) METHOD AND APPARATUS FOR MULTIPLEXING MULTIPLE PROTOCOL HANDLERS ON A SHARED MEMORY BUS (75) Inventors: Michael Joseph Azevedo, San Jose, CA (US); Andrew Dale Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 982 days.

This patent is subject to a terminal disclaimer.

(21) Appl. No.: 11/532,936

(22) Filed: Sep. 19, 2006

(65) Prior Publication Data

US 2008/0109577 A1    May 8, 2008

Related U.S. Application Data (63) Continuation of application No. 10/177,222, filed on Jun. 21, 2002, now Pat. No. 7,136,400.

(51) Int. Cl.
*H04J 3/16* (2006.01)
*H04J 3/04* (2006.01)
*H04L 12/50* (2006.01)

(52) U.S. Cl. ......................... 370/465; 370/535; 370/366
(58) Field of Classification Search ................. 370/535, 370/466, 366, 426, 536, 537, 538, 451, 360, 370/365, 461, 462, 364
See application file for complete search history.

(56) References Cited

U.S. PATENT DOCUMENTS

| 4,608,700 A | * | 8/1986 | Kirtley et al. ............. 370/439 |
| 4,612,670 A | | 9/1986 | Henderson |
| 4,720,634 A | | 1/1988 | D'Auria et al. |
| 4,732,446 A | | 3/1988 | Gipson et al. |
| 5,093,890 A | | 3/1992 | Bregman et al. |
| 5,487,120 A | | 1/1996 | Choy et al. |
| 5,631,807 A | | 5/1997 | Griffin |

(Continued)

FOREIGN PATENT DOCUMENTS

JP        11-4229        1/1999

(Continued)

OTHER PUBLICATIONS

Patent Abstract and Machine Translation for JP2000105642, published on Apr. 11, 2000, 23 pgs.

(Continued)

*Primary Examiner*—Hanh Nguyen
(74) *Attorney, Agent, or Firm*—William Konrad; Konrad Raynes and Victor LLP (57) ABSTRACT Protocol multiplexer is configured to receive multiple communication links, each link operating with one of a plurality of communication protocols. Protocol handler converts the received data and frames the data according to the communication protocol in use for a particular communication link. Port multiplexer separates the received frames into data frames and control frames. The data frames being multiplexed onto a single data bus and the control frames being multiplexed onto a single control bus to increase performance of the protocol multiplexer.

16 Claims, 7 Drawing Sheets

U.S. PATENT DOCUMENTS

| | | | |
|---|---|---|---|
| 5,689,600 | A | 11/1997 | Griffin |
| 5,754,726 | A | 5/1998 | Peterson et al. |
| 5,822,475 | A | 10/1998 | Hirota et al. |
| 5,914,955 | A | 6/1999 | Rostoker et al. |
| 5,995,262 | A | 11/1999 | Hirota et al. |
| 6,038,355 | A | 3/2000 | Bishop |
| 6,148,004 | A | 11/2000 | Nelson et al. |
| 6,158,118 | A | 12/2000 | Munoz-Bustamante et al. |
| 6,185,648 | B1 | 2/2001 | Munoz-Bustamante et al. |
| 6,377,998 | B2 * | 4/2002 | Noll et al. .................. 709/236 |
| 6,466,592 | B1 | 10/2002 | Chapman |
| 6,577,633 | B1 | 6/2003 | Kunito et al. |
| 6,697,874 | B1 | 2/2004 | Friden et al. |
| 6,781,985 | B1 * | 8/2004 | Feder et al. ................. 370/376 |
| 7,136,400 | B2 * | 11/2006 | Azevedo et al. ............. 370/535 |

FOREIGN PATENT DOCUMENTS

| | | |
|---|---|---|
| JP | 114229 | 1/1999 |
| JP | 2000-105642 | 4/2000 |
| JP | 2000105642 | 4/2000 |

OTHER PUBLICATIONS

Patent Abstract for JP11004229, published Jan. 6, 1999, 1 pg.

* cited by examiner

METHOD AND APPARATUS FOR MULTIPLEXING MULTIPLE PROTOCOL HANDLERS ON A SHARED MEMORY BUS

BACKGROUND OF THE INVENTION

1. Field of the Invention

This invention relates in general to multiplexing protocol handlers to allow access to a shared memory bus, and more particularly, to multiplexing multiple protocol handlers operating in accordance with multiple communication protocols for access to a shared memory bus.

2. Description of Related Art

Today's computing systems have seen several decades of evolution. Evolution has transformed one-of-a-kind, custom built machines into common, everyday appliances found in most homes today. Central processing units (CPU), which were the size of refrigerators, requiring many kilowatts (kW) of power and associated cooling, have been reduced to printed circuit board (FOB) implementations, which have proliferated the computing industry. The relatively few peripherals operated in combination with the early CPUs, including tape readers, teletypes, line printers, etc., were tightly coupled to the early CPUs, thus yielding highly customized computing solutions.

The integrated circuit (IC) is largely, if not wholly, responsible for the drastic reduction in the size and power requirements of the early computing solutions. In addition, the IC is largely responsible for the exponential increase in the computational capabilities of the modern day desktop computer. Through the development of the IC, not only has the CPU been reduced to printed circuit board implementations, but so have peripherals such as Random Access Memory (RAM), high resolution graphics, full motion video drivers and high bandwidth networking cards, to name only a few. Each of the peripheral applications implemented on PCB's share a common communication architecture with the CPU called the computer bus.

The computer bus allows communication between the CPU, or processor, and its peripherals. The computer bus is generally separated into several functional groups such as address, data and control. The address group of the computer bus identifies the specific peripheral attached to the computer bus as well as a particular component contained within the peripheral, such as a register or memory location. The data group of the computer bus defines the information transferred to or received from the peripheral. The control group of the computer bus defines the method or protocol used to effect data or control transfers on the computer bus.

Contemporary computer buses operate in a synchronous fashion, such that all transactions on the computer bus occur synchronously with a rising or failing edge of a master bus clock. The master bus clock, however, is typically slower than the speed of the processor attached to the bus, thereby creating a performance bottleneck at the computer bus level. Subsequently, computer bus speeds have increased in order to reduce the performance bottleneck. However, increasing computer bus speeds requires reduced computer bus lengths in order to control propagation delay. Performance of the computer bus is also limited by the number of peripheral devices attached to the computer bus. The number of peripheral devices attached to the contemporary computer bus increases the effective capacitance of the computer bus, adversely effecting computer bus transfer rates.

One of the earlier computer buses, Industry Standard Architecture (ISA), established itself as an evolutionary enhancement of the time, being well matched to processor performance and peripheral requirements of the early personal computers (PCs). The ISA computer bus, however, soon fell victim to the increasing performance demands of graphical computing. The Video Electronics Standards Association Local (VL) bus provided a subsequent attempt to overcome the limitations of the ISA computer bus architecture. The VL bus strategy is to attach, for example, a video controller, as well as other high bandwidth peripheral devices, directly to the processor's local bus, equating the bus speed of the peripheral device attached to the VL bus to that of the processor's bus speed. The VL bus was successful in increasing the bus speeds of the peripheral devices. However, the VL bus exhibited its own shortcomings, such as a severe limitation on the number of VL bus peripheral devices allowed to operate on the VL bus. In addition, VL bus peripheral devices were necessarily processor dependent.

The Peripheral Component Interconnect (PCI) bus has been developed to provide coherence and standardization, improving upon the ISA and VL bus limitations. The PCI bus specification first appeared in 1992, with subsequent revisions published in 1993, 1995 and 1999. The PCI bus specification provides several features, which potentially allows PCI implementations to accommodate computer architectures for many years to come. PCI bus transfer rates, for example, allow for hundreds of megabytes (MB) of data to be transferred per second. Any peripheral device attached to the PC bus can become a bus master, i.e., responsible for initiating transactions on the PCI bus, thus reducing overhead workload for the processor. The PCI bus is processor independent, such that peripheral devices attached to the PCI bus need only comply with the PCI bus specification to be operable, regardless of the specific processor being used. PCI implementations allow peripheral devices that are newly introduced to the computing architecture to be automatically configured. This automatic configuration process is more commonly referred to as plug and play. The PCI bus, however, along with its ISA and VL bus predecessors, limits the number of peripheral devices that can share a particular PCI bus segment. In order to accommodate multiple PCI peripheral devices and even to accommodate a mixture, for example, of PCI and ISA bus compatible peripheral devices, PCI bridging is used.

PCI bridging allows for expansion of the PCI bus, such that multiple PCI peripheral devices can operate on the PCI bus. These are separated into their own PCI bus segments and then bridged to allow access to the PCI bus. Several types of bridges exist, for example, such as the PCI-to-PCI, Host-to-PCI and PCI-to-legacy bus bridges. The PCI-to-PCI bridge allows multiple PCI bus segments to be interconnected, such that each segment allows a fixed number of PCI peripheral devices to be connected to the PCI bus.

The advent of the PCI bus has allowed a multitude of computing peripherals to be integrated with a single host server or a multitude of host servers. Storage devices, for example, are becoming an increasingly prevalent peripheral as electronic storage needs are increasing to maintain pace with today's computing society.

Storage Area Networks (SAN) are networks that connect the storage devices or systems to their hosting servers. SANs are differentiated from previous interconnection schemes in that the SANs allow centralized management of one large storage area, while facilitating connectivity between the host servers and the storage devices. Historically in SAN environments, physical interfaces to storage devices consisted of parallel Small Computer Systems Interface (SCSI) channels supporting a small number of SCSI devices. More recent developments of SANs, however, have begun to use new technologies to connect greater numbers of host servers and storage devices.

Enterprise System Connection (ESCON®), for example, was a first attempt at creating a SAN environment that allowed growth in the numbers of host servers and storage devices existing within the SAN by integrating the use of fibre optic technology. The ESCON® model, however, generally limits the interconnection to only ESCON® compliant hosts and ESCON®, compliant devices. Fibre Connectivity (FICON), which is based on the industry standard Fibre Channel architecture, is one of the newest fibre optic channel standards being employed today.

Although ESCON® is a relatively mature technology, large numbers of communication subsystems, printers, tape drives, storage subsystems, etc. continue to be produced which support the ESCON® protocol. With the large numbers of ESCON® peripherals available to interface with the PCI based host systems, along with the emerging FICON technology, as well as the large number of SCSI legacy peripherals, an interconnect device is needed that would have the capability to mix and/or match the various protocol handlers on a single card. The interconnect device should also have multiplexing capability to facilitate management of multiple control and data streams into a single control path and a single data path.

Prior art PCB solutions have either utilized large, non-PCI compliant PCBs that require unique power and packaging costs, or have chosen to package only one or two protocol handlers on a PCI compliant PCB, which limits the data handling capacity of the PCI compliant PCB.

It can be seen, therefore, that there is a need for a method and apparatus that provides bus access to a plurality of protocol handlers, while multiplexing and arbitrating the bus access as required.

Furthermore, there is a need to place the protocol handlers and protocol multiplexers on a single circuit to significantly reduce the space required for such functions.

It can further be seen that there is a need for a method and apparatus allowing a mixture of protocol handlers on a single circuit, so that interconnect access can be gained by ESCON®, FICON, SCSI, etc. based interface protocols without requiring the need to bridge each protocol used.

SUMMARY OF THE INVENTION

To overcome the limitations in the prior art described above, and to overcome other limitations that will become apparent upon reading and understanding the present specification, the present invention discloses a method and apparatus for multiplexing a plurality of control and data streams into single control and data streams in order to facilitate shared memory access via a PCI bus.

The present invention solves the above-described problems by implementing a plurality of protocol handlers on a single ASIC. By integrating multiple protocol handlers with a mixture of protocols onto a single ASIC, significant cost and space reductions can be realized.

The protocol handlers may be of mixed protocols or the same protocol. The present invention then multiplexes the plurality of protocol handlers to allow for a single control path and a single data path by an on board processor complex. The data is transferred to memory for subsequent transfer via a bus transfer function to the requesting system.

An apparatus in accordance with the principles of the present invention includes a protocol multiplexer comprising a plurality of protocol handlers for receiving signals, each signal operating in accordance with one of a plurality of communication protocols and for providing data and control streams in response to the processed signals. The protocol multiplexer further comprising a port multiplexer for receiving the data and control streams and for multiplexing the data streams into a first path and for multiplexing the control streams into a second path.

In another embodiment of the present invention, an article of manufacture comprises a program storage medium readable by a computer, the medium tangibly embodying one or more programs of instructions executable by the computer to perform a method of multiplexing a plurality of communication links operating in accordance with a plurality of communication protocols. The method comprises receiving signals from the communication links according to one of a plurality of communication protocols for each communication link and separating data and control signals received from the communication links into separate data and control paths.

In another embodiment of the present invention, a method of multiplexing a plurality of communication links operating in accordance with a plurality of communication protocols. The method comprises receiving signals from the communication links according to one of a plurality of communication protocols for each communication link and separating data and control signals received from the communication links into separate paths.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a plurality of protocol handlers on a single circuit, e.g., an ASIC, which may be of mixed protocols or the same protocol. The present invention multiplexes the plurality of protocol handlers to allow for a single control path and a single data path by an on board processor complex. The data is transferred to memory for subsequent transfer via a PCI to PCI bus function.

Figure 1:
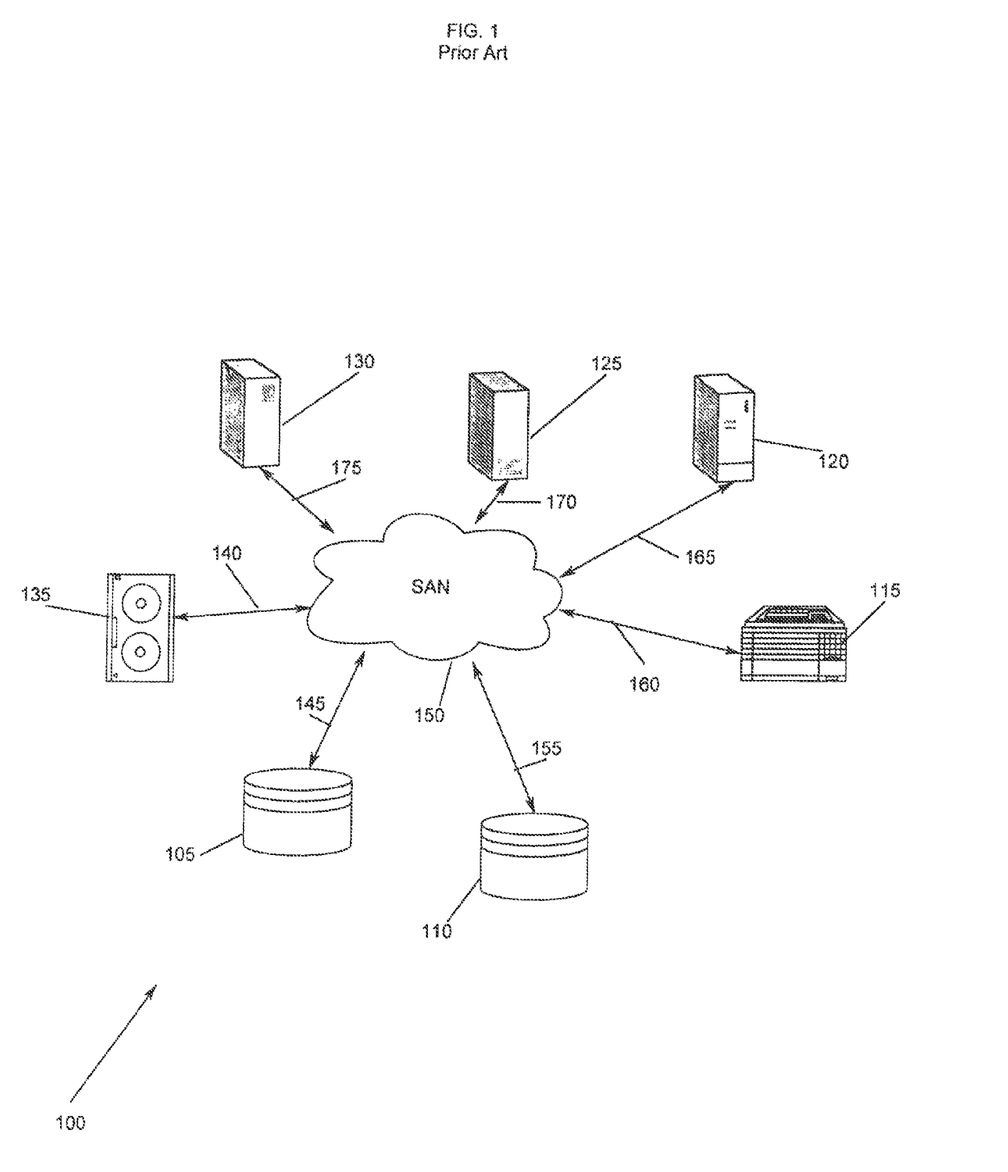
FIG. 1 illustrates a typical storage area network.

FIG. 1 illustrates a block diagram of a typical SAN 100 employing servers 120, 125 and 130 having access to SAN interconnection and management cloud 150. Storage devices 105 and 110 provide storage capability for servers 120-130. Tape drive 135 and printer 115 represent examples of other peripheral devices that may be interconnected to servers 120-130 and storage devices 105 and 110 via SAN cloud 150. Interfaces 140-145 and 155-175 from SAN cloud 150 to each of the components connected to SAN cloud 150 may be comprised of any combination of ESCON®, FICON, SCSI, etc. based protocol interfaces via interconnect entities such as host bus adapters, bridges, hubs, etc.

Another hardware element deployed in SAN cloud 150 of FIG. 1 is a SAN appliance or SAN server (not shown). The SAN appliances are computing elements attached directly to SAN 150 or installed directly in the storage data and control path. The SAN appliances are responsible for managing the channel topology, as well as the data storage abstraction. The SAN appliances may be based on standard computing hardware running, for example, UNIX or NT operating system software.

Conventional SAN appliances are typically confined to a particular protocol, whether it be ESCON® or FICON, for example, and some conventional SAN appliances may even perform a bridge function from ESCON® to FICON or FICON to ESCON® as required. In either case, conventional SAN appliances are only compatible with one particular protocol and an additional bridge or conversion module is necessary to map ESCON® protocol into FICON protocol or vice versa.

Figure 2:
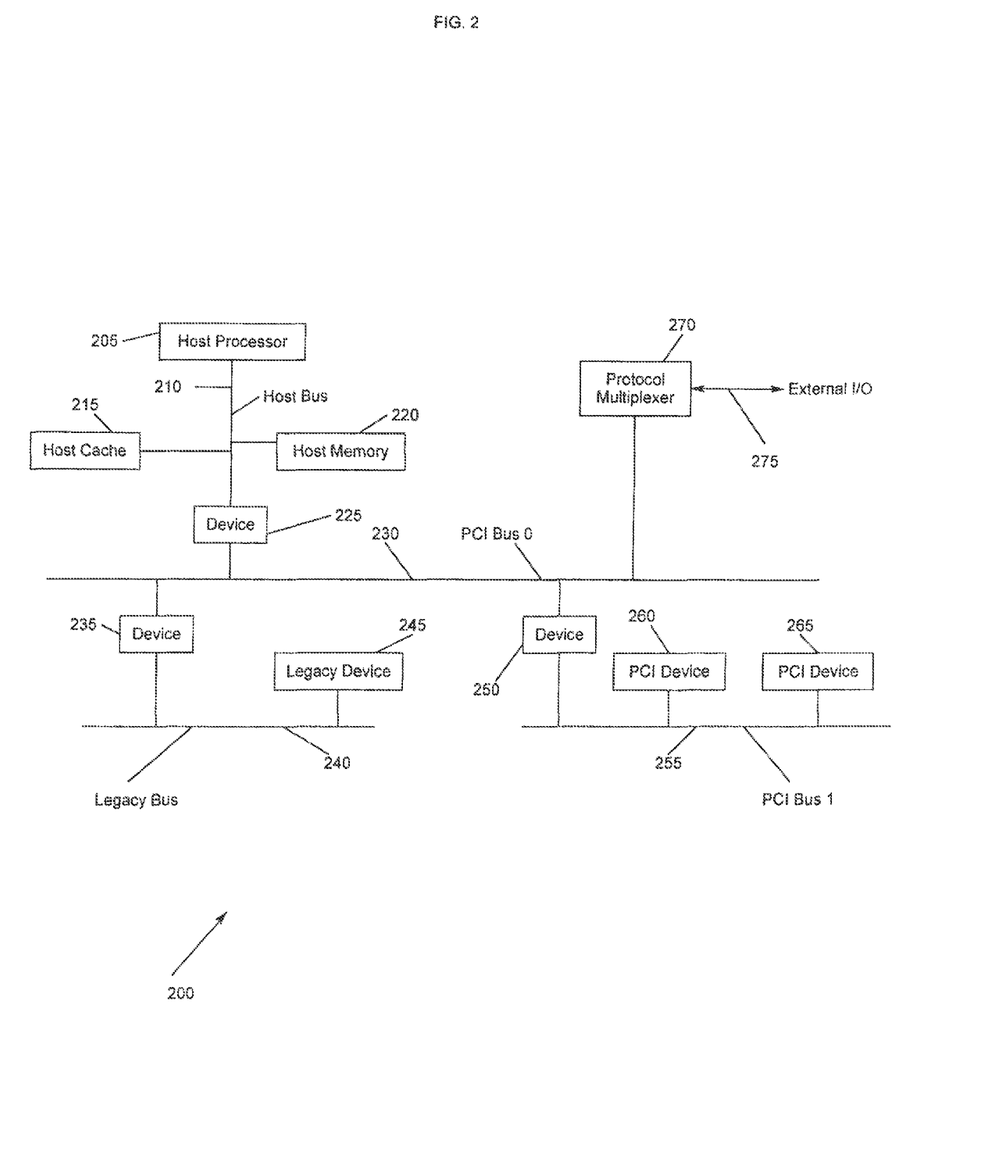
FIG. 2 illustrates a PCI bus implementation.

FIG. 2 illustrates an exemplary PCI bus implementation 200 that may be configured to implement a SAN appliance according to the present invention. Although a PCI bus implementation is shown, any bus architecture may be used. The illustration of PCI bus implementation 200 is not intended to be a limiting feature, but rather is presented to facilitate an understanding of the invention.

PCI bus implementation 200 uses a bridge hierarchy to accommodate PCI bus interconnection of host processor 205, PCI devices 260 and 265, and legacy device 245. Legacy device 245 may be any device required to be interoperable with the PCI bus, such as an ISA or VL compliant device. Legacy device 245 may be, for example, representative of I/O devices that provide input services such as keyboard and mouse operations, as well as two way operations with hard disk drives and serial I/O ports.

Protocol multiplexer 270 is connected to PCI bus 0 230 and communicates with host processor 205 through device 225. Legacy device 245 is connected to legacy bus 240 and communicates with host processor 205 via device 235 and device 225. Host processor 205 utilizes host cache 215 and host memory 220 for memory operations via host bus 210. Devices 225, 235 and 250 implement the required bridges, memory controllers, interrupt controllers, bus arbiters, etc. for proper PCI bus communication management.

Protocol multiplexer 270 may be configured with internal bus management devices to be compliant with any bus architecture. Protocol multiplexer 270, as exemplified in FIG. 2, is configured to be PCI bus compliant and may act as a bus master. External Input/Output (I/O) 275 represents a plurality of communication interfaces having any combination of communication protocols associated with the communication interfaces to include, for example, ESCON®, FICON and SCSI.

PCI devices 260 and 265 may consist of a complete peripheral adapter encapsulated within an IC package or integrated onto a PCI compliant PCB. Typical examples of PCI devices 260 and 265 include networking adapters, display adapters or Small Computer Systems Interface (SCSI) adapters, to name only a few. Each of PCI devices 260 and 265 may act as bus masters, in which they each may initiate PCI transactions when acting as bus masters. An arbiter contained within device 250 arbitrates access between PCI bus 1 255 and PCI bus 0 230, so that PCI devices 260 and 265, acting as bus masters, do not conflict with each other.

Figure 3:
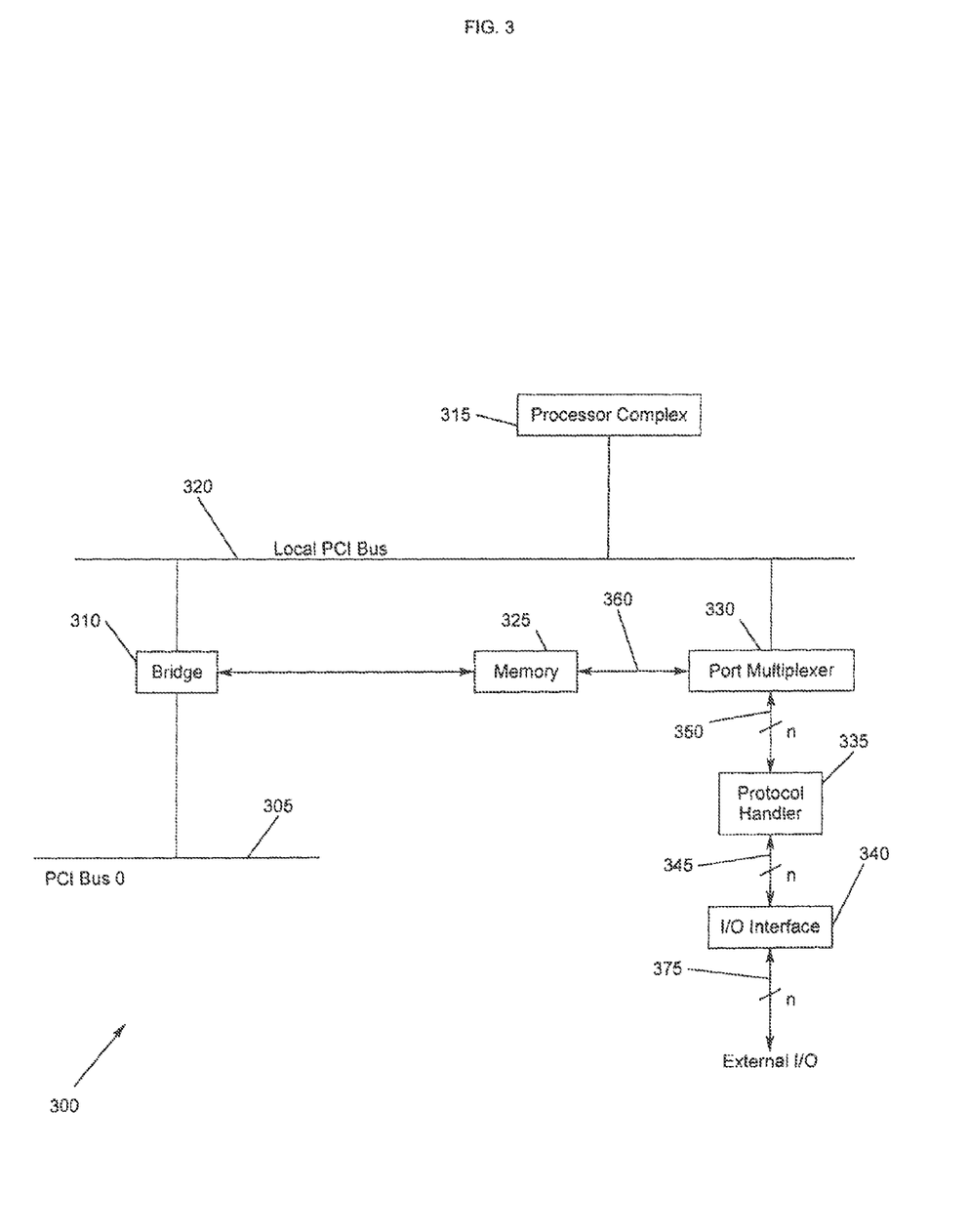
FIG. 3 illustrates a block diagram of a protocol multiplexer.

FIG. 3 illustrates an exemplary block diagram of a protocol multiplexer 300 according to the present invention. Processor complex 315 contains the necessary processor, cache, memory, interrupt controller, PCI bridge, etc. required to effect control of protocol multiplexer 300 via local PCI bus 320. PCI bus 0 305 provides data access to protocol multiplexer 300 from any system hosting protocol multiplexer 300, which may include UNIX or NT based hosts, for example. External I/O is received via the n-interfaces 375. External interfaces 375 may represent an optical interface transmitting serial data when connected to ESCON® or FICON based communication protocols, for example, or may represent a parallel copper interface when accepting SCSI protocol. In FIG. 3, protocol handler 335 is configured to receive n-interfaces 345 from I/O interface 340 and to provide 10-bit wide parallel data at each of n-interfaces 350 to port multiplexer 330.

Protocol multiplexer 330 and protocol hander 335 are compatible with a multitude of Integrated Circuit (IC) processing technologies. A bipolar process implementing Emitter Coupled Logic (ECL), for example, is advantageous for high speed applications. A Complimentary Metal Oxide Semiconductor (CMOS) process, on the other hand, may be desirable if quiescent power consumption minimization is a design constraint.

Turning back to FIG. 1, the protocol multiplexer 300 of FIG. 3 may represent, for example, a SAN appliance at interface boundary 145 of SAN cloud 150, being responsible for handling data write and data read requests to disk array 105 from any of servers 120-130. Interface 145 may constitute any number of optical or parallel interfaces that may be required by SAN cloud 150 to facilitate such transactions, as discussed above.

In the case of an optical interface, I/O interface 340 is configured to receive serial data transmitted over an optical link. The optical link being implemented using either a single mode or a multi-mode fibre optic cable. Single mode allows the SAN appliance to be physically separated from the transmitter by up to 20 kilometers (kM) without retransmission, using dispersion-unshifted, single mode trunk fibre cable. Multi-mode allows up to a 3 kM separation without retransmission, using multi-mode trunk fibre cable. The data transmitted over the optical link is based on an 8-bit/10-bit non-return-to-zero code (8 b/10 b).

The 8 b/10 b transmission code transmits a high optical power level to represent a 1-bit and transmits a low optical power level to represent a 0-bit and an idle function or one of the sequence functions is sent repetitively during periods when information is not being sent. The data transmission rate for the ESCON® protocol is approximately 200 mega bits per second (Mbps), corresponding to a 20 mega byte per second (20 MBps) data rate. The data transmission rate for the FICON protocol is on the order of a factor of ten better than the transmission rate for ESCON®, or approximately 212 MBps. Optical signals received on n-interface lines 375 are converted to electrical signals by I/O interface 340, in the case of an ESCON® or FICON interface, and subsequently placed on n-interface lines 345.

Figure 4:
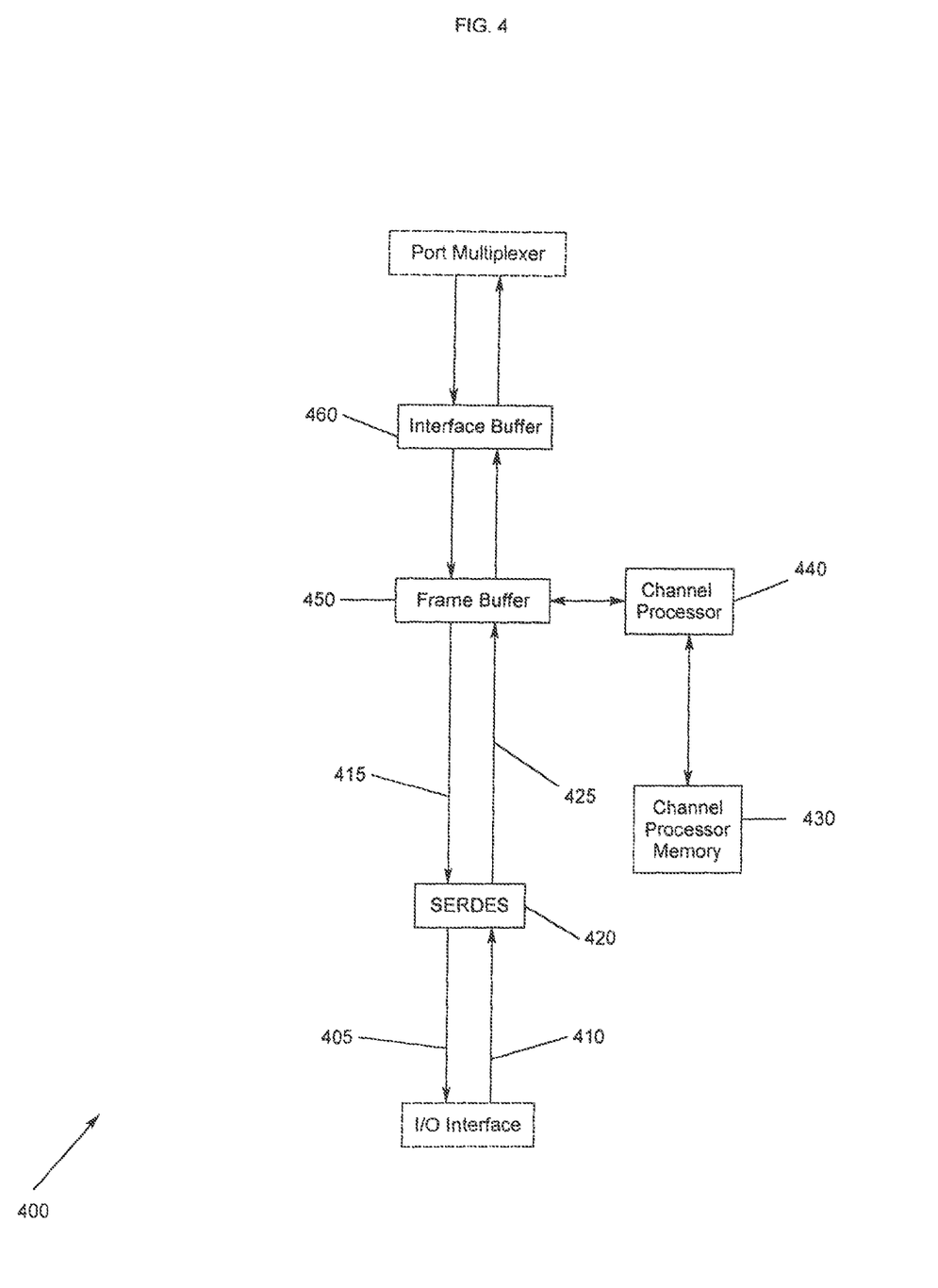
FIG. 4 illustrates the protocol handler of FIG. 3.

FIG. 4 illustrates an exemplary block diagram of protocol handler 400 for a serial data link. Protocol handler 400 is responsible for receiving/providing data and control streams from I/O interfaces 410 and 405, respectively, and converting the data and control streams into data and control frames, a process known as framing, according to the hierarchical arrangement predefined by the protocol. Protocol handler 400 utilizes Serializer/De-serializer (SERDES) 420 to format the incoming serial data into 10-bit parallel data words. Interface 410 provides a serial receive path and interface 405 provides a serial transmit path. SERDES 420, therefore, comprises both a receive core for receiving serial data from interface 410 and a transmit core for transmitting serial data to interface 405. Both the transmit core and the receive core utilize a Phase-Locked Loop (PLL) to maintain correct timing across the link. It should be noted that SERDES 420 is not required when a parallel SCSI link is used.

De-serialized data is transferred to frame buffer 450 in 10-bit parallel format via interface 425 and de-serialized data is received from frame buffer 450 in 10-bit parallel format via interface 415. Frame buffer 450 allows full-duplex storage of incoming 10-bit frames from SERDES 420 as well as incoming 10-bit frames from interface buffer 460. Interface buffer 460 provides additional drive capability to support loads imposed by port multiplexer 330 of FIG. 3.

Channel processor 440, in combination with channel processor memory 430, sets the operational features of protocol handler 400. In other words, channel processor 440 may be programmed for specific operation for the particular protocol being utilized, whether it be ESCON® protocol, FICON protocol or for the SCSI protocol, to name only a few. Channel processor 440 for example, is responsible for handshaking Channel Command Words (CCW) received at interface 410 and for reporting status results on interface 405 from port multiplexer 330 of FIG. 3 as a result of the completion of the tasks defined by the CCWs.

FICON has recently emerged as a leading protocol for optical communications and is based on the Fibre Channel architecture, defining a five layer protocol stack, FC-0 through FC-4. Channel processor 440 may, therefore, be programmed, for example, to frame information incoming on interface 410, according to the FICON protocol as briefly discussed below.

FC-0, the first of the five protocol layers, defines the media and interface characteristics of the serial links between ports. Copper, multi-mode fibre and single-mode fibre being the supported media types.

FC-1 specifies the 8 b/10 b coding scheme for converting eight-bit data bytes into 10-bit transmission signals, or packets, as well as specifying the special character sequences called Ordered Sets (OS) which are used for a variety of control functions. The 10-bit packets defined in FC-1 are balanced, meaning that the number of 1's and 0's transmitted are balanced within one bit at word boundaries. The 256 characters of the 83 bit ASCII data space are converted to a 512 character subset of the 1024 possible characters in the 10-bit space. Each character being assigned two different transmission codes, each code having a differing number of 1's and 0's.

FC-2 specifies the basic control mechanisms within Fibre Channel, such as the classes of service, flow control, loop arbitration, and the different kinds of logins that are used. Message constructs are also defined hierarchically in FC-2 as words, frames, sequences, and exchanges.

FC-3 defines common services provided by two or more ports, while FC-4 is used to specify the Upper Level Protocol (ULP) that runs on the Fibre Channel interface. The most common protocol in use today being the Fibre Channel Protocol (FCP), which is the SCSI protocol mapped to fibre channel.

Turning back to FIG. 3, port multiplexer 330 accepts 10-bit parallel data from protocol handler 335 via interface 350. Port multiplexer 330 provides a decoding capability, which converts the 10-bit parallel data stream into an 8-bit parallel data stream. Port multiplexer 330 additionally multiplexes the control and data streams coming from each of n-interfaces 350 to allow for a single control path, which is controlled by processor complex 315, and further allows for a single data path to be processed through internal First In First Out (FIFO) memory in conjunction with memory 325.

Figure 5:
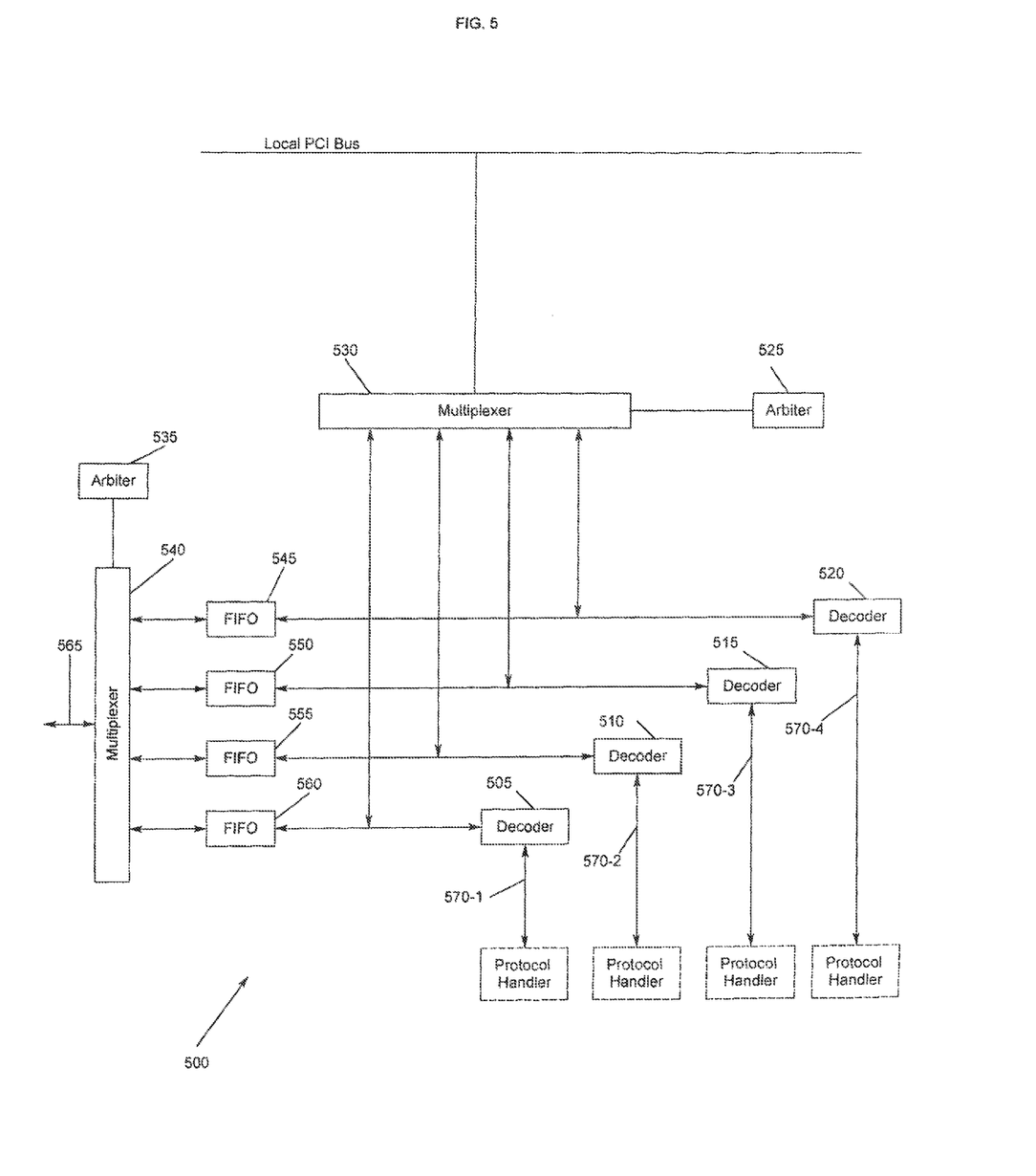
FIG. 5 illustrates the port multiplexer of FIG. 3.

FIG. 5 illustrates an exemplary block diagram of port multiplexer 500 according to the present invention. Interface 570 is illustrated such that n=4, signifying that four protocol handlers are being utilized to accept four separate data streams. It should be noted that each data stream may represent a different protocol according to the particular protocol programmed into the protocol handlers. One protocol handler is required for each interface 570-n accepted. It should further be noted that although four data streams 570-1 through 570-4 are denoted, any number of data streams may be accepted by port multiplexer 500 subject to, among other things, bandwidth restrictions imposed by the local PCI bus, interface 565, memory depth of FIFOs 545-560, size of PCB used, etc.

Decoders 505-520 convert 10-bit parallel control and data streams received from the protocol handlers to 8-bit parallel control and data streams. The control and data streams hierarchically feed into control and data frames and may be addressed to either multiplexer 530 or multiplexer 540. The control frames being addressed to multiplexer 530, while the data frames are addressed to multiplexer 540.

Arbiters 525 and 535 control multiplexers 530 and 540, respectively, to arbitrate which of the four streams of data frames are allowed onto interface 565, in the case of multiplexer 540, and which of the four streams of control frames are allowed onto the local PCI bus, in the case of multiplexer 530. Round robin techniques may be used by arbiters 525 and 535 to invoke such control, or alternatively, more elaborate techniques may be used. Priority assignments, for example, may be allocated such that multiplexer 530 arbitrates 50% allocation to one control input, while the other 3 control inputs are allocated equal shares of the remaining 50% control. Interrupt techniques may also be used such that priority is established based on an interrupt level given to each input of multiplexers 530 and 540.

Referring again to FIG. 3, processor complex 315 receives control data from port multiplexer 330 via local PCI bus 320 in order to off-load host processor 205 of FIG. 2. In other words, processor complex 315 maintains, for example, DMA memory access control of memory 325 based on any I/O requests that may be received from external I/O 375. Based upon memory read or memory write requests, for example, processor complex 315 seizes control of PCI bus 0 305 through bridge 310 to facilitate DMA data transfer to/from memory 325 from/to the requesting device.

Figure 6:
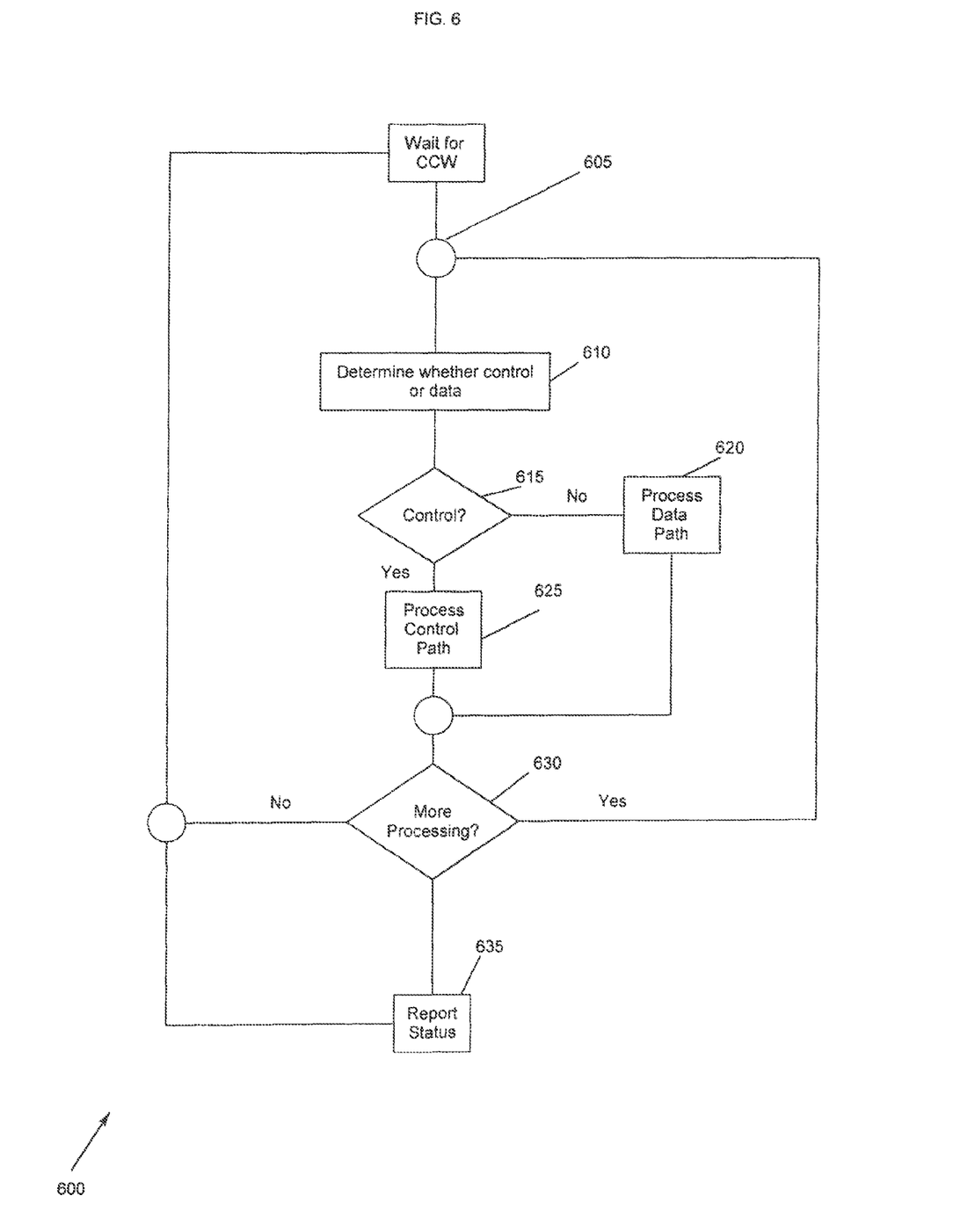
FIG. 6 illustrates a flow diagram of an exemplary operation performed by the protocol multiplexer of FIG. 3.

A flow diagram of a data read command scenario is illustrated in FIG. 6 of an exemplary ESCON® channel program process, which is facilitated by protocol multiplexer 270 of FIG. 2. As discussed above, protocol multiplexer 270 in combination with PCI bus implementation 200 of FIG. 2, for example, may be implemented as a SAN appliance in relation to SAN 100 illustrated in FIG. 1.

A data read CCW is propagated through SAN cloud 150 to the SAN appliance destination exemplified by PCI bus implementation 200 of FIG. 2, whereby protocol multiplexer 270 is configured to control the transaction. Storage device 105 of FIG. 1 may be a SCSI device, for example, physically connected to PCI device 260 of FIG. 2, whereby PCI device 260 conducts I/O operations with storage device 105 as directed by I/O commands presented on PCI bus 0 230.

The transmitted CCW is received and the command process is started at 605, where the control frame, being a read request, is addressed as a control frame by protocol handler 335 of FIG. 3 and further processed at step 625. Once the control frame is decoded by decoders 505-520 of FIG. 5, multiplexer 530 is responsive to the control frame. Accordingly, the control frame must be multiplexed onto the local PCI bus according to a round robin or priority algorithm enforced by arbiter 525 as discussed above.

Processor complex 315 of FIG. 3 initiates all necessary PCI control functions to facilitate a data transfer from disk storage 105 of FIG. 1 to memory 325 in response to the data read control frame. Once all control functions have been executed to support the data transfer, additional processing 630 is required to actually perform the data transfer at step 620.

Storage device 105 supplies the requested data to memory 325 of FIG. 3 as directed by processor complex 315. A Direct Memory Access (DMA) from memory 325 is conducted by processor complex 315 to requesting server 130 of FIG. 1. The path taken for data transfer, however, is different than the path taken for control transfer discussed above. The data transfer path, rather, starts at memory 325 of FIG. 3 and is selected by multiplexer 540 of FIG. 5 into one of associated FIFOs 545-560 according to the priority algorithm executed by arbiter 535, which is similar to the priority algorithm discussed above for arbiter 525. One of decoders 505-510 converts the data from 8-bit parallel to 10-bit parallel and protocol handler 335 of FIG. 3 provides the data to interface 375 in accordance with ESCON® protocol. Once the data transfer has been completed, status is reported 635 to complete the data transfer.

It should be noted that two distinct processing paths are defined within protocol multiplexer 270 of FIG. 2. The command frames are processed via multiplexer 530 of FIG. 5, while the data frames are processed via multiplexer 540 of FIG. 5. The separation of command and data is an advantage provided by protocol multiplexer 270 according to the present invention, since an improvement in throughput performance is realized by such a specific approach to data and command multiplexing.

It should be further noted that although a data read sequence is illustrated by command sequence 600 of FIG. 6, the corresponding data write sequence may be deduced from the discussion above, whereby the data transfer direction is reversed. Other data transfer sequences may be facilitated as well to for example, tape drive 135 or printer 115 of FIG. 1 in a similar manner.

Figure 7:
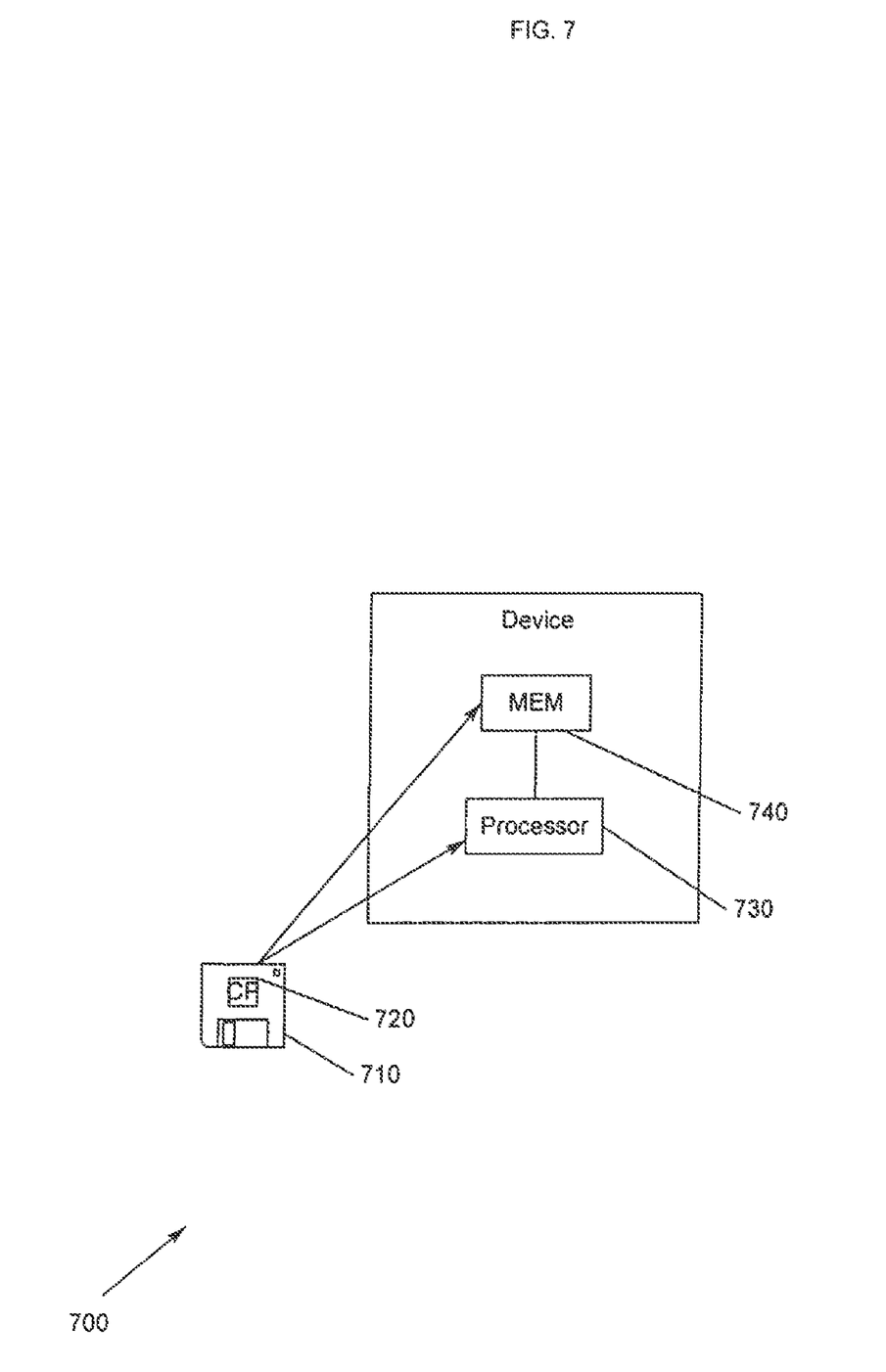
FIG. 7 illustrates a PCI device that is configured for operation using an executable program readable from a storage medium by a computer.

FIG. 7 illustrates device 700 according to the present invention, wherein the process illustrated with reference to FIGS. 1-6 may be tangibly embodied in a computer-readable medium or carrier, e.g. one or more of the fixed and/or removable data storage devices 710 illustrated in FIG. 7, or other data storage or data communications devices. A computer program 720 expressing the processes embodied on the removable data storage devices 710 may be loaded into the memory 740 and executed by processor 730, to configure device 700 of FIG. 7, for execution. The computer program 720 comprises instructions which, when read and executed by PCI device 700 of FIG. 7, causes device 700 to perform the steps necessary to execute the steps or elements of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A protocol multiplexer, comprising:
   a plurality of protocol handlers adapted to receive signals, each signal operating in accordance with one of a plurality of communication protocols and adapted to provide data and control streams in response to the received signals and each of the plurality of protocol handlers configured to process a different communication protocol, wherein the protocol handler comprises:
   a serializer/deserializer adapted to convert the signal from a serial format signal to a parallel format signal; and
   a channel processor configured to operate in accordance with one of the communication protocols to frame the parallel format signal in response to the communication protocol; and
   a port multiplexer adapted to receive the data and control streams and adapted to multiplex the data streams between a first path and one of the plurality of protocol handlers according to a communication protocol associated with the data stream and to multiplex the control streams into a second path, wherein the port multiplexer comprises:
   a decoder adapted to convert the parallel format signal from a first format to a second format;
   a first multiplexer adapted to receive the control streams of the second format from the decoder and to provide a control function in response to the controls streams; and
   a second multiplexer adapted to receive the data streams of the second format and to provide the data streams in response to the control function.

2. The protocol multiplexer of claim 1, further comprising:
   a first arbiter, coupled to the first multiplexer, adapted to grant access of the control streams to a single control bus; and
   a second arbiter, coupled to the second multiplexer, adapted to grant access of the data streams to a single data bus.

3. The protocol multiplexer of claim 2, wherein the first arbiter grants access according to a round robin algorithm.

4. The protocol multiplexer of claim 2, wherein the first arbiter grants access according to a priority algorithm.

5. The protocol multiplexer of claim 2, wherein the second arbiter grants access according to a round robin algorithm.

6. The protocol multiplexer of claim 2, wherein the second arbiter grants access according to a priority algorithm.

7. An article of manufacture comprising a non-transitory program storage medium readable by a computer, the medium tangibly embodying one or more programs of instructions executable by the computer to perform a method of multiplexing a plurality of communication links operating in accordance with a plurality of communication protocols, the method comprising:
   receiving signals at a plurality of protocol handlers, each signal operating in accordance with one of a plurality of communication protocols and providing data and control streams in response to the received signals, each of the plurality of protocol handlers configured to process a different communication protocol, wherein stream providing includes:
  converting the signal from a serial format signal to a parallel format signal using a serializer/deserializer; and
  framing the parallel format signal in response to one of the communication protocols using a channel processor configured to operate in accordance with one of the communication protocols;
multiplexing the data streams between a first path and one of the plurality of protocol handlers according to a communication protocol associated with the data stream; and
multiplexing the control streams into a second path,
wherein the stream multiplexing includes:
  converting the parallel format signal from a first format to a second format using a decoder;
  receiving control streams of the second format from the decoder and providing a control function in response to the controls streams, using a first multiplexer; and
  receiving the data streams of the second format and providing the data streams in response to the control function, using a second multiplexer.

8. The article of claim 7, wherein multiplexing the data streams includes arbitrating the data streams according to a round robin algorithm.

9. The article of claim 7, wherein multiplexing the data streams includes arbitrating the data streams according to a priority algorithm.

10. The article of claim 7, wherein multiplexing the control streams includes arbitrating the control streams according to a round robin algorithm.

11. The article of claim 7, wherein multiplexing the control streams includes arbitrating the control streams according to a priority algorithm.

12. A method of multiplexing a plurality of communication links operating in accordance with a plurality of communication protocols, the method comprising:
  receiving signals at a plurality of protocol handlers, each signal operating in accordance with one of a plurality of communication protocols and providing data and control streams in response to the received signals, each of the plurality of protocol handlers configured to process a different communication protocol, wherein stream providing includes:
    converting the signal from a serial format signal to a parallel format signal using a serializer/deserializer; and
    framing the parallel format signal in response to one of the communication protocols using a channel processor configured to operate in accordance with one of the communication protocols;
  multiplexing the data streams between a first path and one of the plurality of protocol handlers according to a communication protocol associated with the data stream; and
  multiplexing the control streams into a second path,
  wherein the stream multiplexing includes:
    converting the parallel format signal from a first format to a second format using a decoder;
    receiving control streams of the second format from the decoder and providing a control function in response to the controls streams, using a first multiplexer; and
    receiving the data streams of the second format and providing the data streams in response to the control function, using a second multiplexer.

13. The method of claim 12, wherein multiplexing the data streams includes arbitrating the data streams according to a round robin algorithm.

14. The method of claim 12, wherein multiplexing the control streams includes arbitrating the control streams according to a round robin algorithm.

15. The method of claim 12, wherein multiplexing the data streams includes arbitrating the data streams according to a priority algorithm.

16. The method of claim 12, wherein multiplexing the control streams includes arbitrating the control streams according to a priority algorithm.

* * * * *